United States Patent
Ronen et al.

(10) Patent No.: US 8,572,358 B2
(45) Date of Patent: Oct. 29, 2013

(54) META PREDICTOR RESTORATION UPON DETECTING MISPREDICTION

(71) Applicants: Ronny Ronen, Haifa (IL); Mattan Erez, Cupertino, CA (US); Stephan Jourdan, Portland, OR (US); Adi Yoaz, Austin, TX (US)

(72) Inventors: Ronny Ronen, Haifa (IL); Mattan Erez, Cupertino, CA (US); Stephan Jourdan, Portland, OR (US); Adi Yoaz, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/647,153

(22) Filed: Oct. 8, 2012

(65) Prior Publication Data

US 2013/0036297 A1 Feb. 7, 2013

Related U.S. Application Data

(63) Continuation of application No. 09/749,405, filed on Dec. 28, 2000, now Pat. No. 8,285,976.

(51) Int. Cl.
G06F 9/00 (2006.01)
G06F 9/44 (2006.01)

(52) U.S. Cl.
USPC .......................... 712/239; 712/234; 712/240

(58) Field of Classification Search
USPC ........................................ 712/234, 239, 240
See application file for complete search history.

(56) References Cited

U.S. PATENT DOCUMENTS

| | | | | |
|---|---|---|---|---|
| 5,367,703 A * | 11/1994 | Levitan | ............................ | 712/23 |
| 5,553,253 A * | 9/1996 | Pan et al. | ........................ | 712/240 |
| 5,687,360 A * | 11/1997 | Chang | ............................ | 712/240 |
| 5,758,142 A * | 5/1998 | McFarling et al. | ........... | 712/239 |
| 5,822,575 A * | 10/1998 | Tran | ................................ | 712/239 |
| 5,864,697 A * | 1/1999 | Shiell | ............................ | 712/240 |
| 5,909,567 A * | 6/1999 | Novak et al. | .................. | 712/208 |
| 5,954,816 A * | 9/1999 | Tran et al. | ..................... | 712/239 |
| 5,978,909 A * | 11/1999 | Lempel | ......................... | 712/240 |
| 5,995,749 A * | 11/1999 | Tran | ............................... | 712/239 |
| 6,092,187 A * | 7/2000 | Killian | ............................ | 712/239 |
| 6,253,316 B1 * | 6/2001 | Tran et al. | ..................... | 712/239 |
| 6,292,815 B1 * | 9/2001 | Abdallah et al. | .............. | 708/204 |
| 6,425,076 B1 * | 7/2002 | Killian | ........................... | 712/239 |
| 6,502,188 B1 * | 12/2002 | Zuraski et al. | ................. | 712/234 |
| 6,560,696 B1 * | 5/2003 | Hummel et al. | ............... | 712/237 |
| 6,598,152 B1 * | 7/2003 | Sinharoy | ....................... | 712/228 |

(Continued)

OTHER PUBLICATIONS

Chang, Po-Yung, et al., "Alternative Implementations of Hybrid Branch Predictors", IEEE Proceedings of MICRO-29, (1995), 252-257.

(Continued)

*Primary Examiner* — Aimee Li
(74) *Attorney, Agent, or Firm* — Schwegman, Lundberg & Woessner, P.A.

(57) ABSTRACT

Methods and apparatus for restoring a meta predictor system upon detecting a branch or binary misprediction, are disclosed. An example apparatus may include a base misprediction history register to store a set of misprediction history values each indicating whether a previous branch prediction taken by a previous branch instruction was predicted correctly or incorrectly. The apparatus may comprise a meta predictor to detect a branch misprediction of a current branch prediction based at least in part on an output of the base misprediction history register. The meta predictor may restore the base misprediction history register based on the detecting of the branch misprediction. Additional apparatus, systems, and methods are disclosed.

20 Claims, 5 Drawing Sheets

(56) References Cited

U.S. PATENT DOCUMENTS

| | | | | |
|---|---|---|---|---|
| 6,625,744 | B1* | 9/2003 | Rappoport et al. | 714/2 |
| 6,792,524 | B1* | 9/2004 | Peterson et al. | 712/235 |
| 6,823,446 | B1* | 11/2004 | Sinharoy | 712/239 |
| 8,285,976 | B2 | 10/2012 | Jourdan et al. | |

OTHER PUBLICATIONS

Heuring, Vincet P, et al., "Computer Systems Design and Architecture", Reading, Mass.: Addison Wesley Longman, Inc., (1997), 537.

Jacobsen, Erik, et al., "Assigning Confidence to Conditional Branch Predicions", IEEE, (1993), 142-152.

McFarling, Scott, "WRL Technical Note TN-36: Combining Branch Predicors", Palo Alto, CA: Digital Western Research Laboratory, (1993), 1-25.

Rosenberg, Jerry M, "Dictionary of Computers, Information Processing, and Telecommunications.", Second Edition. New York: John Wiley & Sons. tag., (1987), 632.

Yeh, Tse-Yuh, et al., "Alternative Implementations of Two-Level Adaptive Branch Predictions", ACM, (1992), 124-134.

* cited by examiner

META PREDICTOR RESTORATION UPON DETECTING MISPREDICTION

PRIORITY APPLICATION

This application is a continuation of U.S. application Ser. No. 09/749,405, filed Dec. 28, 2000, which is incorporated herein by reference in its entirety.

BACKGROUND

State of the art microprocessors achieve high performance by processing multiple instructions per cycle and by implementing deep pipelines. To reduce latency while executing the instructions, processors implement predictors to predict if a branch may be taken by a branch instruction that is waiting on a concurrently executing instruction. Mispredictions occur when the branch prediction is incorrect. When a misprediction is detected, pipeline flushes occur to resume execution on the correct path. The pipeline flushes are a major limitation to processor performance. This limitation especially is harsh for deep and wide machines on most modern processors. The time between a branch misprediction and the resumption of execution on the correct path is wasted by processing instructions along the wrongly predicted path. Thus, processors that improve their branch prediction accuracy can reduce mispredictions and increase their overall performance by performing more work in less time.

FIG. 1 depicts a block diagram of an instruction pipeline that is known in the art. Instruction 1 is processed by pipeline 10. Instruction 2 and other subsequent instructions also are processed by pipeline 10. Thus, instructions share the same pipeline. Pipeline 10 follows a repeated order of stages for executing the instructions. The following discussion describes the stages for executing instructions on pipeline 10. Fetch 11 fetches the instruction 1 from memory. Decode 12 decodes instruction 1. For example, decode 12 may determine if instruction 1 is an add, load or branch instruction. Read 13 reads the source operand values of instruction 1. Instruction 1 is ready to be executed. Execute 14 executes instruction 1. Write 15 writes the result of execute 14 to memory or a register specified by instruction 1. Retire 16 retires the instruction 1, and frees resources.

Instruction 2 follows the same stages as instruction 1. Pipeline 10 uses fetch 11, decode 12, read 13, execute 14, Write 15 and retire 16 to process instruction 2. Instruction 2 is in a stage behind instruction 1 in pipeline 10. While instruction 1 is in the decode stage, instruction 2 is in the fetch stage. If an instruction 3 is fetched, then instruction 2 is in the decode stage and instruction 1 is in the read stage. Every stage is working on a different instruction at a given time. For example, instruction 1 may be ADD EAX, EBX. This instruction will add the contents of register EBX to the contents of register EAX, and store the result in register EAX. Instruction 2 may be ADD ECX, EAX. This instruction will add the contents of register EAX to the contents of register ECX, and store the results in register ECX. Instruction pipeline 10 waits until write 15 of instruction pipeline 10 to receive the value for EAX before read 13 may be executed.

Additional concerns arise when instruction 2 is a branch. Fetch 11 fetches instruction 2, but does not know which instruction is to be fetched next. Until the condition of the branch instruction 2 is resolved, fetch 11 is stalled. Thus, if instruction 2 is BRANCH (EAX=0), GO 200, fetch 11 will not fetch any more instructions until instruction 2 is processed by execute 14. Once the condition is evaluated by the execution stage, the target of the branch is known and fetch 11 resumes. Cycles are wasted as instruction 2 is being processed until execute 14 to fetch the next instruction. Modern processors seek to reduce this latency period by predicting the direction that instruction 2 will take. As discussed above, branch predictors may be used to predict when a branch is taken.

Mispredictions occur when the wrong direction is predicted by the branch predictor. In the example above, the branch predictor for instruction 2 may predict 200 as the probable branch target, which is taken. Instruction 1, however, yields a different result because EAX does not equal, causing instruction 2 to mispredict. Instructions processed after the bad fetch of the misprediction are flushed. As a result, all the work performed processing the instructions starting at address 200 is discarded, and execution resumes with the instruction sequentially following instruction 2.

Prediction schemes exist for implementing branch predictors to reduce the penalty associated with branch mispredictions. A branch predictor speculates on whether the branch is taken or not taken. Branch predictors generally include a target address buffer to record branch target addresses and a prediction table to deliver predicted directions. A target address buffer will indicate whether the target address is a branch, and the target of the branch. The prediction table may implement a prediction scheme that facilitates an accurate prediction for the branch instruction. A taken result may be indicated by a 1, and a not taken result may be indicated by a 0.

One scheme is the "last time" method that simply stores a bit in the branch predictor for every branch instruction that indicates if the branch was taken or not taken the last time the branch was executed. If the branch was taken last time, then the prediction is to take the branch. Another scheme is the "bimodal" method that stores two bits for every branch (modulo the size of the predictor tables) in the branch predictor. Like the last time method, the bimodal method updates the bits depending upon the final direction of the branch instruction. A taken branch results in an increment of the related two-bit counter while a not-taken branch results in a decrement. Counters saturate on both ends. The upper two states lead to a taken prediction, and the lower two states to a not-taken prediction.

Another scheme is the local prediction method. The local prediction method looks at the outcomes of previous instances of the current branch. The local prediction method uses a field in the target address buffer to store bits for these last N instances of that branch. For each new prediction, the bits indicating taken/not taken results will be shifted and the new outcomes inserted. Thus, older results are moved out of the prediction field, while more recent results are stored. This method still uses a prediction table with a 1 or 2 bit scheme, as discussed above. While the bimodal scheme uses only the address of the branch instruction to index the prediction table, the local scheme uses the outcome of past instances in addition to the index.

Another scheme is the global prediction method. The global prediction method looks at the outcomes of N preceding branches. A field or register builds a history, similar to the local prediction method, but the history will be of the last N previous branches in program order. As a branch is taken or not taken, the field or register shifts to update the history. The prediction table is indexed by both the address of the branch instruction and the content of this history register. A hybrid scheme also exists that combines the local and global prediction methods. This scheme may select which method to use. Both methods are executed with the results being input to a multiplexer. A predictor predicts the method that would give the best prediction.

The methods discussed above are all based on previous branch outcomes. The methods do not correlate misprediction data to improving prediction efficiency.

DETAILED DESCRIPTION

Various embodiments are directed to a branch predicting apparatus that reduces branch mispredictions in a processor. The branch prediction apparatus includes a misprediction history register. The branch prediction apparatus includes a meta predictor that receives an index value and a branch prediction to generate a misprediction value in accordance with the misprediction history register. The branch prediction apparatus also includes a logic gate that receives the branch prediction and the misprediction value to generate a final prediction. The final prediction may be used to predict whether a branch is taken or not taken.

Figure 1:
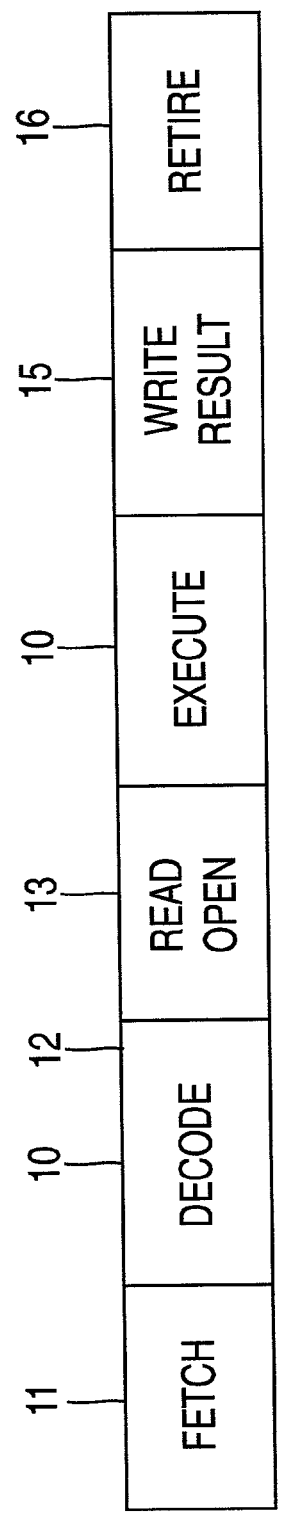
FIG. 1 illustrates a block diagram of an instruction pipeline according to the prior art.
Figure 2:
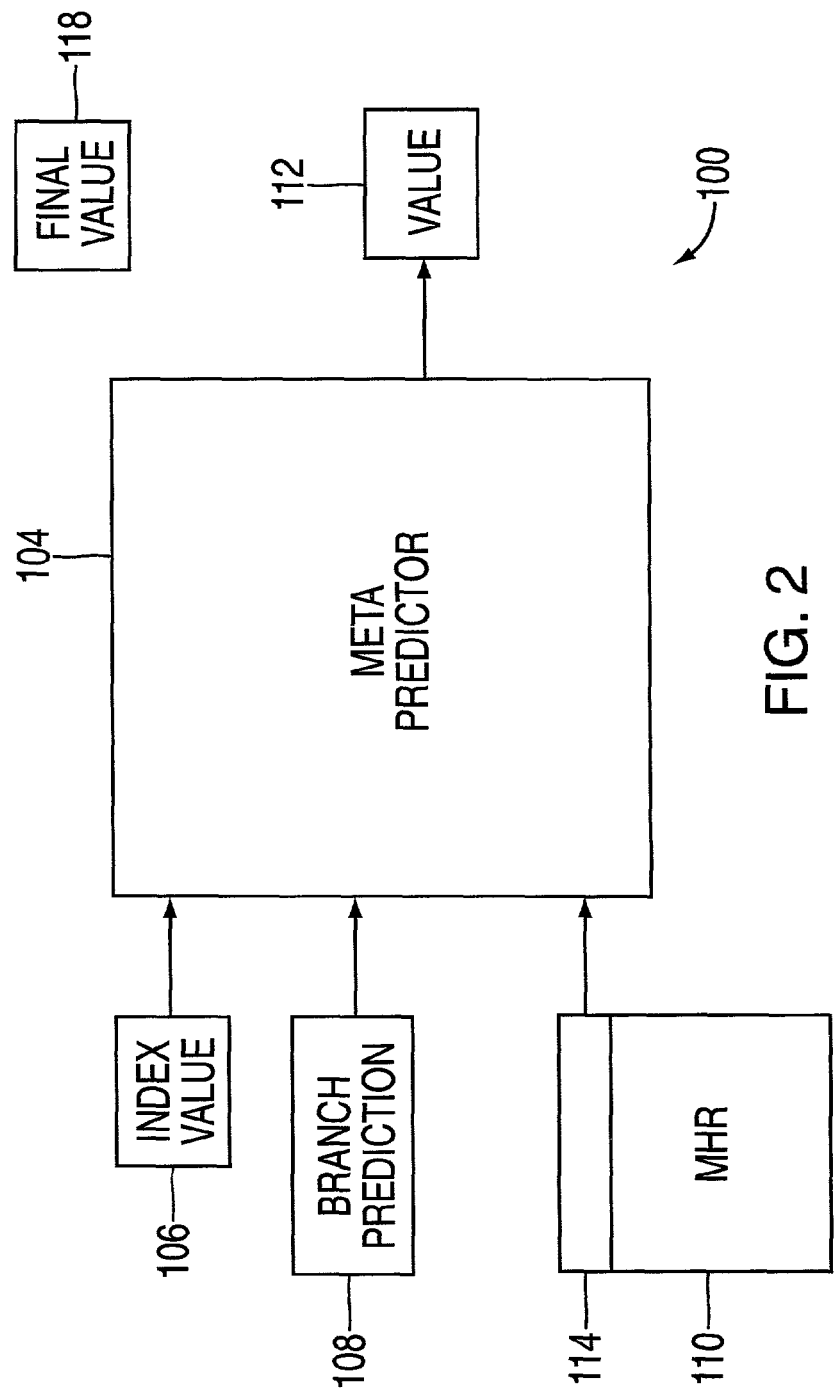
FIG. 2 illustrates a block diagram of a meta predictor apparatus according to various embodiments.

Referring now in detail to the drawings wherein like parts are designated by like reference numerals throughout, FIG. 2 depicts a meta predictor apparatus 100 according to various embodiments. Meta predictor apparatus 100 includes meta predictor 104. Meta predictor 104 receives index information 106 and branch prediction 108 and reads from base misprediction history register 110 in generating misprediction value 112. Final value 118 is the final value after the instruction has been processed, and the branch resolved. If branch prediction 108 is correct, then it should equal final value 118. If meta predictor apparatus 100 predicts that branch prediction 108 is incorrect, then meta predictor 104 generates misprediction value 112 to alter branch prediction 108. This altered value is used as the predicted outcome of the branch instruction, and should be compared to final value 118 at the execution stage.

In various embodiments, meta predictor 104 may be a misprediction predictor. Typically, branch mispredictions are not uniformly distributed. The probability of several mispredictions occurring close together is high. For example, a misprediction distribution should not resemble a uniformly distributed process or, alternatively, a memory-less random process. Instead, the probability of a small misprediction distance is large. Thus, clusters of mispredictions may be common. Misprediction clusters may be explained by the fact that current branch predictors strive to reach a stable state. A misprediction may be an indicator for possible unstable events that disrupt the regularity learned by the branch predictor. Therefore, branch predictors are likely to mispredict before attaining another stable state.

Meta predictor apparatus 100 utilizes the correlation between the outcomes of past branches, the predicted outcome, and the correctness of previous predictions. Meta predictor 104 detects incorrect predictions by correlating the correctness of the current prediction, or branch prediction 108, with the correctness of previous predictions, as determined by base misprediction history register 110. By exploiting the clustering correlation, meta predictor 104 is able to detect unstable conditions and their effects on the correctness of following predictions.

As discussed above, base misprediction history register 110 reflects the correctness of the base predictor standing alone. Unlike global history registers that record whether previous branches were taken or not taken, base misprediction history register 110 records whether previous branch predictions were correctly predicted by the base predictor. Base misprediction history register 110 may be similar to the register used in global prediction methods in that base misprediction history register 110 is concerned with what previous branches have done. The size of base misprediction history register 110 may be variable, depending on the desired amount of global misprediction history data.

The base misprediction history register 110 may be updated by comparing the final value 118 to the branch prediction 108. Base misprediction history register 110 reflects whether the last N instances of branch prediction 108 have been correct or incorrect. If branch prediction 108 does not equal final value 118, then base misprediction history register 110 inserts a 1 by shifting the register. If branch prediction 108 equals final value 118, then the original branch prediction is correct and base misprediction history register 110 inserts a 0 by shifting the register. Thus, clusters of mispredictions are stored. Further, because mispredictions tend to occur in clusters, base misprediction history register 110 should include at least one misprediction prior to carrying out any meta predictions via meta predictor 104. If base misprediction history register 110 is nothing but values, then meta predictor 104 would not reverse any branch prediction 108. Meta predictor 104 should be bypassed, and not be accessed, if base misprediction history register 110 is filled with 0 values. A transition should occur before meta predictor 104 is brought into the prediction operations for branch prediction 108. Thus, in cases where base misprediction history register 110 is all 0 values, branch prediction 108 may not be reversed or altered by meta predictor 104.

Index value 106 may be indexing information referring to the branch instruction. This information may include control-flow indicators such as the branch instruction pointer. Index value 106 also may include compressed path information, the outcomes of previous branches, the outcomes of previous occurrences of the current branch, or heuristics based on the branch type or program structure. Branch prediction 108 is an output from a base predictor that indicates a branch instruction should be taken or not taken. As discussed above, the base predictor may employ any prediction scheme, including local or global prediction schemes. Both index value 106 and branch prediction 108 are input into meta predictor 104.

Meta predictor 104 also reads misprediction history data 114 from base misprediction history register 110. Using misprediction history data 114, branch prediction 108 and index value 106, meta predictor 104 generates misprediction value 112. Misprediction value 112 then may be used to decide whether to reverse the prediction provided by the base predictor, or branch prediction 108. Meta predictor 104 may implement any scheme suitable for binary prediction. For example, meta predictor 104 can implement a two level prediction scheme, much like most branch predictors.

Meta predictor 104 includes a two (2) bit counter for every possible index value modulo the size of the tables in this embodiment. The index is formed by index value 106, branch prediction 108, and misprediction history data 114. Prediction schemes using the two bit register may be implemented to predict prediction value 112. Because of the two bit counter configuration, each index may have four possible values in meta predictor 104. These values are updated as final value 118 is determined by incrementing/decrementing the counters. If branch prediction 108 is equal to final value 118, then the base prediction was correct. The corresponding counters in meta predictor 104 for index value 106 are decremented to reflect the correctness of branch prediction 108. If branch prediction 108 is not equal to final value 118, then the base prediction was incorrect and the corresponding counters in meta predictor 104 are incremented. Such updates may be performed only if the content of the base misprediction history register 110 is not all zeros (0) prior to the branch.

Figure 3:
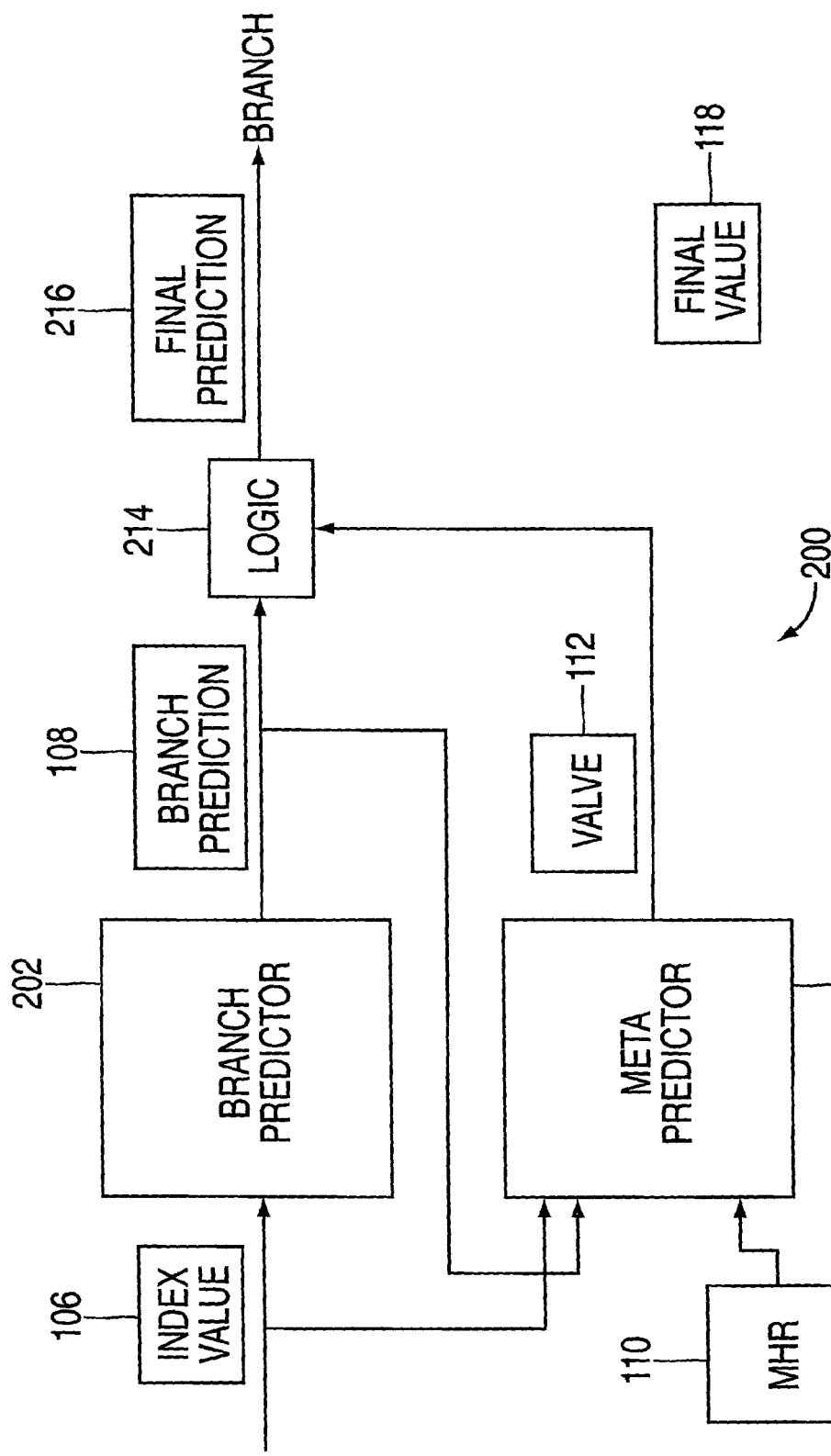
FIG. 3 illustrates a block diagram of a branch predictor apparatus having a meta predictor apparatus according to various embodiments.

FIG. 3 depicts a branch prediction apparatus 200 according to various embodiments. Branch predictor 202 is coupled to meta predictor 104. Branch predictor 202 generates branch prediction 108 according to a prediction scheme implemented by branch predictor 202. Branch predictor 202 receives index value 106. As discussed above, index value 106 may be any information used by the prediction scheme in branch predictor 202. Prediction schemes use index value information in determining whether a branch should be taken or not taken. For example, index value 106 may be an instruction pointer address for the address of the branch instruction. Branch prediction 108 is a taken/not taken prediction generated by branch predictor 202.

Branch predictor 202 is updated with final value 118. Because branch predictor 202 is not concerned with the "correctness" of branch prediction 108, a comparison should not be made between branch prediction 108 and final value 118. The history register of branch predictor 202 is updated with the value of final value 118, while counters within branch predictor 202 are incremented/decremented if the branch was taken or not taken for the corresponding index value 106.

Meta predictor 104 receives index value 106, branch prediction 108 and reads from base misprediction history register 110. Base misprediction history register 110 reflects the correctness of branch predictor 202. By using index value 106, meta predictor 104 uses the same index information as branch predictor 202. As discussed above, meta predictor 104 may implement a prediction scheme similar to branch predictor 202. For example, meta predictor 104 may implement a two level prediction scheme using two bit saturating counters. The difference between meta predictor 104 and branch predictor 202 involves the indexing function, such as the added misprediction history register information, and the branch prediction 108 generated by branch predictor 202. The indexing function may be a concatenation of the different inputs to meta predictor 104, or a complex hash function. As with other cached structures, many different possibilities exist for distributing the indexing information from index value 106 between the actual index and the value used to tag each meta predictor entry, if there is a tagged structure. Misprediction value 112 is generated according to the current state of the two bit saturating counters associated with the accessed entry, or branch instruction.

Misprediction value 112 is used to augment branch prediction 108. Logic gate 214 receives misprediction value 112 and branch prediction 108. Logic gate 214 determines whether to reverse branch prediction 108 according to misprediction value 112. If misprediction value 112 predicts that branch prediction 108 is correct, then logic gate 214 does not reverse branch prediction 108. If misprediction value 112 predicts that branch prediction 108 in incorrect, then logic gate 214 reverses branch prediction 108. Using the inputs, logic gate 214 generates a final prediction 216. Final prediction 216 predicts whether the branch instruction should be taken or not taken.

On a branch misprediction by branch prediction apparatus 200, the contents of base misprediction history register 110 is restored to its value just after the prediction of the faulting branch. A similar process is performed for the history register of branch predictor 202.

Thus, meta predictor 104 increases the accuracy of binary predictors, such as branch predictor 202. The improved predictor performance is achieved by using the correct/incorrect prediction information within misprediction value 112, as well as the regular information used for prediction. Meta predictor 104 extends the correlating mechanisms of current predictors and works with any base predictor. The increased branch prediction accuracy translates directly into processor performance speedup by reducing the number of pipeline flushes.

Although the embodiments discussed above were in the context of branch predictors, the concept of meta prediction is not limited to the domain of branch prediction. Various embodiments may be extended to other binary predictors.

Figure 4:
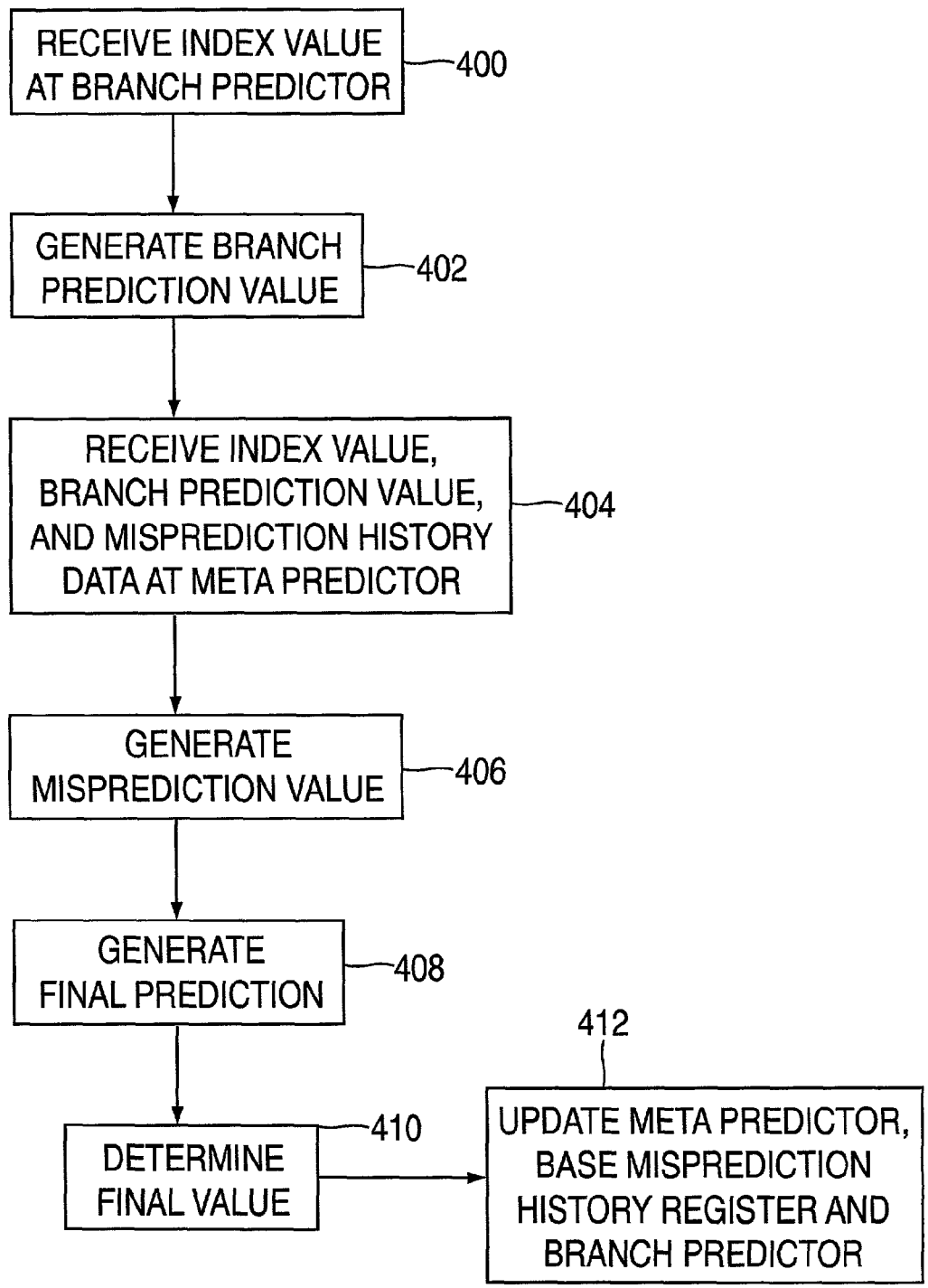
FIG. 4 illustrates a flowchart of a method for predicting branches according to various embodiments.

FIG. 4 depicts a flowchart of a method for predicting branches according to various embodiments. At 400, a branch predictor receives an index value. At 402, the branch predictor generates a branch prediction. At 404, a meta predictor receives the index value, the branch prediction and a misprediction value from a base misprediction history register. The base misprediction history register stores the misprediction history of the branch predictor. At 406, the meta predictor generates a misprediction value. At 408, a logic gate generates a final prediction value according to the branch prediction and the misprediction value. At 410, a final value is determined by the instruction being executed and processed, and the branch being resolved. At 412, the final value is used to update the meta predictor, the base misprediction history register, and the branch predictor. By comparing the final value to the branch prediction, the meta predictor and the base misprediction history register note whether the base branch prediction was correct. Using this information, the meta predictor then may predict whether a branch prediction is correct. The branch predictor is updated by the final value with regard to whether the branch was taken or not taken. The history register of the branch predictor also is updated.

Figure 5:
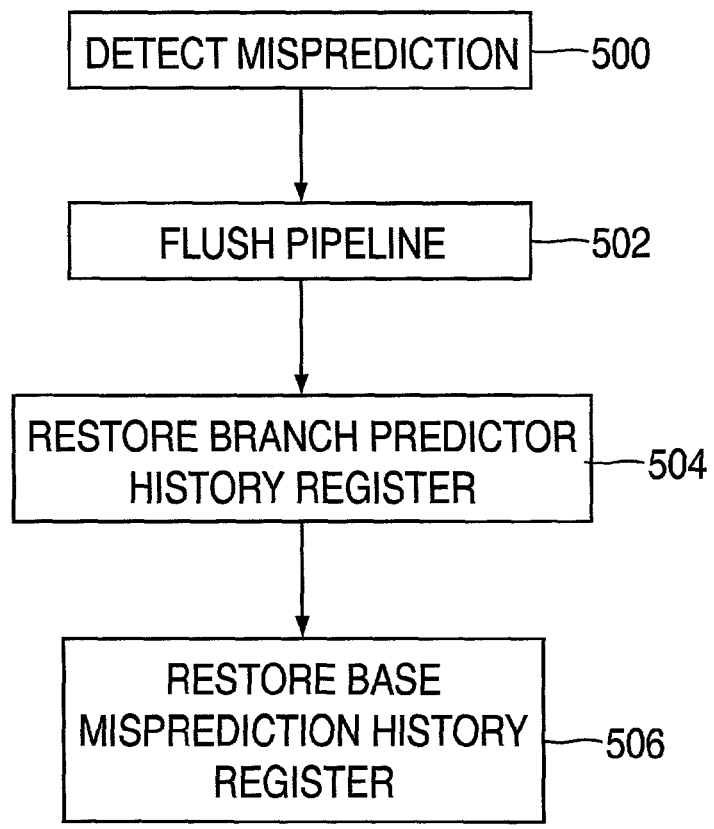
FIG. 5 illustrates a flowchart of a method for resolving a branch misprediction within a branch predictor and a meta predictor, according to various embodiments.

FIG. 5 depicts a flowchart of a method for resolving a branch misprediction within a branch predictor and a meta predictor, according to various embodiments. At 500, a branch misprediction is detected within the instruction pipeline. Branch mispredictions occur when a branch predictor mispredicts whether a branch is to be taken or not taken. The instruction pipeline has processed subsequent instructions according to the incorrect branch prediction. At 502, the instruction pipeline is flushed of the incorrectly processed instructions, and placed at the fetch stage for the branch instruction that was mispredicted. At 504, the branch predictor history register is restored to its value previous to the mispredicted branch instruction. The branch predictor history register is restored to the last N occurrences prior to the mispredicted branch instruction. At 506, base misprediction history register is restored to the last N occurrences prior to the mispredicted branch instruction. As noted above, base misprediction history register reflects the correctness or incorrectness of recent branch instructions, and is restored to reflect this history prior to the mispredicted branch instruction.

Thus, it is apparent that there has been provided, in accordance with the various embodiments disclosed herein, a method and apparatus for predicting branches or restoring from a misprediction using a meta predictor. Although various embodiments have been disclosed in detail, it should be understood that various changes, substitutions, and alterations may be made herein. Moreover, although software and hardware are described to control certain functions, such functions can be performed using either software, hardware or a combination of software and hardware, as is well known in the art. Other examples are readily ascertainable by one of ordinary skill in the art and may be made without departing from the spirit and scope of various embodiments, for example, as defined by the following claims.

What is claimed is:

1. An apparatus comprising:
a base misprediction history hardware register to store a set of misprediction history values, each of the misprediction history values to indicate whether a previous branch prediction taken by a previous branch instruction was predicted incorrectly; and
a hardware meta predictor to detect a branch misprediction of a current branch prediction for an instruction based at least in part on an output of the base misprediction history hardware register, the hardware meta predictor further to restore the base misprediction history hardware register based on the detecting of the branch misprediction.

2. The apparatus of claim 1, wherein the hardware meta predictor is configured to
set the base misprediction history hardware register with values corresponding to a specified number of previous branch occurrences prior to the branch misprediction.

3. The apparatus of claim 1, further comprising
a branch predictor history register to store a set of prediction history values, each prediction history value to indicate whether a previous branch prediction was taken or not taken.

4. The apparatus of claim 3, wherein the hardware meta predictor is further configured to
restore the branch predictor history register based on the detecting of the branch misprediction.

5. The apparatus of claim 4 wherein the hardware meta predictor is further configured to
set the branch predictor history register with values corresponding to a specified number of previous branch occurrences prior to the branch misprediction.

6. The apparatus of claim 1, wherein the hardware meta predictor is further configured to
flush an instruction pipeline processing the current branch prediction based on the detecting of the branch misprediction.

7. The apparatus of claim 1, wherein the hardware meta predictor is further configured to
generate a misprediction outcome value as at least part of the detecting of the branch misprediction, the misprediction outcome value to predict whether the current branch prediction is correct or incorrect.

8. The apparatus of claim 7, further comprising
a logic gate to generate a final branch prediction based at least in part on the misprediction outcome value, the final branch prediction to indicate whether the current branch prediction is to be altered, reversed, or taken.

9. The apparatus of claim 8, wherein the hardware meta predictor is further configured to
determine the branch misprediction based on comparing the final branch prediction with a final branch value as determined by the instruction being executed.

10. The apparatus of claim 1, wherein the hardware meta predictor is further configured to be bypassed when all bits of the output of the base misprediction history hardware register comprise a same value.

11. An apparatus comprising:
a restorable hardware register to store a set of misprediction history values, each of the misprediction history values to indicate whether a previous binary prediction taken by a previous instruction was predicted incorrectly; and
a hardware meta predictor to detect a binary misprediction of a current binary prediction for an instruction based at least in part on an output of the restorable hardware register, the hardware meta predictor further to restore the restorable hardware register based on the detecting of the binary misprediction.

12. The apparatus of claim 11, wherein the hardware meta predictor is further configured to
generate a misprediction outcome value as at least part of the detecting of the binary misprediction, the misprediction outcome value to predict whether the current binary prediction is correct or incorrect.

13. The apparatus of claim 12, further comprising
a logic gate to alter, reverse, or take the current binary prediction based at least in part on the misprediction outcome value, the altering, reversing, or taking to produce a final binary prediction for the instruction.

14. The apparatus of claim 13, wherein the hardware meta predictor is further configured to
compare the final binary prediction with a final binary value as determined by the instruction being executed.

15. The apparatus of claim 14, wherein the hardware meta predictor is further configured to:
insert a first value to the restorable hardware register based on determining that the final binary prediction matches the final binary value; and
insert a second value to the restorable hardware register based on determining that the final binary prediction does not match the final binary value.

16. The apparatus of claim 14, wherein the hardware meta predictor is further configured to:
adjust a counter for an index value in a first direction based on determining that the final binary prediction matches the final binary value; and
adjust the counter for the index value in a second direction based on determining that the final binary prediction does not match the final binary value.

17. The apparatus of claim 11, wherein the apparatus is configured to
concatenate at least a portion of the output of the restorable hardware register and at least a portion of the current binary prediction.

18. A method comprising:
detecting a binary misprediction within an instruction pipeline; and
restoring a hardware register based on the detecting of the binary misprediction, the hardware register storing a set of misprediction history values, each of the misprediction history values indicating whether a previous binary prediction taken by an instruction was predicted incorrectly.

19. The method of claim 18, further comprising
flushing the instruction pipeline based on the detecting of the binary misprediction.

20. The method of claim 18, further comprising
restoring another register storing a set of prediction history values based on the detecting of the binary misprediction, each of the prediction history values indicating whether a previous binary prediction was taken or not taken.

* * * * *